United States Patent
Hasegawa

(10) Patent No.: US 9,690,750 B2
(45) Date of Patent: Jun. 27, 2017

(54) ARITHMETIC DEVICE, ARITHMETIC METHOD, AND WIRELESS COMMUNICATION DEVICE

(71) Applicant: FUJITSU LIMITED, Kawasaki-shi, Kanagawa (JP)

(72) Inventor: Tsuyoshi Hasegawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 187 days.

(21) Appl. No.: 14/595,895

(22) Filed: Jan. 13, 2015

(65) Prior Publication Data
US 2015/0205758 A1 Jul. 23, 2015

(30) Foreign Application Priority Data
Jan. 17, 2014 (JP) .................................. 2014-007112

(51) Int. Cl.
*G06F 7/38* (2006.01)
*G06F 17/12* (2006.01)

(52) U.S. Cl.
CPC .................................. *G06F 17/12* (2013.01)

(58) Field of Classification Search
CPC ...................................................... G06F 17/12
USPC ......................................................... 708/446
See application file for complete search history.

(56) References Cited

U.S. PATENT DOCUMENTS

| | | | |
|---|---|---|---|
| 5,222,192 A * | 6/1993 | Shaefer | G06Q 10/04 706/13 |
| 5,987,255 A * | 11/1999 | Sundaresan | G06F 8/456 712/16 |
| 8,670,969 B1 * | 3/2014 | Kundert | G06F 17/5036 703/13 |
| 2004/0031026 A1 * | 2/2004 | Srinivasan | G06F 8/452 717/161 |
| 2006/0004996 A1 * | 1/2006 | Gonion | G06F 8/443 712/241 |
| 2008/0120148 A1 * | 5/2008 | Narayanan | G06Q 10/04 705/7.11 |
| 2009/0268085 A1 | 10/2009 | Myaskouvskey et al. | |

FOREIGN PATENT DOCUMENTS

| | | |
|---|---|---|
| JP | 09-016640 A | 1/1997 |
| JP | 10-320444 A | 12/1998 |
| JP | 2009-266230 A | 11/2009 |
| JP | 2010-532128 A | 9/2010 |
| WO | WO 2009/004572 A1 | 1/2009 |

* cited by examiner

*Primary Examiner* — Tan V. Mai
(74) *Attorney, Agent, or Firm* — Arent Fox LLP

(57) ABSTRACT

An arithmetic device including: a plurality of parallel processors, and a processor configured to control the plurality of parallel processors so as to calculate an approximate solution of an equation by using a first algorithm and a second algorithm switchably, each of the first algorithm and the second algorithm being algorithms providing an iterative method, the second algorithm causing a divergence more likely than the first algorithm, the second algorithm being performed more efficiently by the plurality of parallel processors than the first algorithm, the first algorithm and the second algorithm being switched each other between at least one pair of iterative steps of the iterative method.

10 Claims, 17 Drawing Sheets

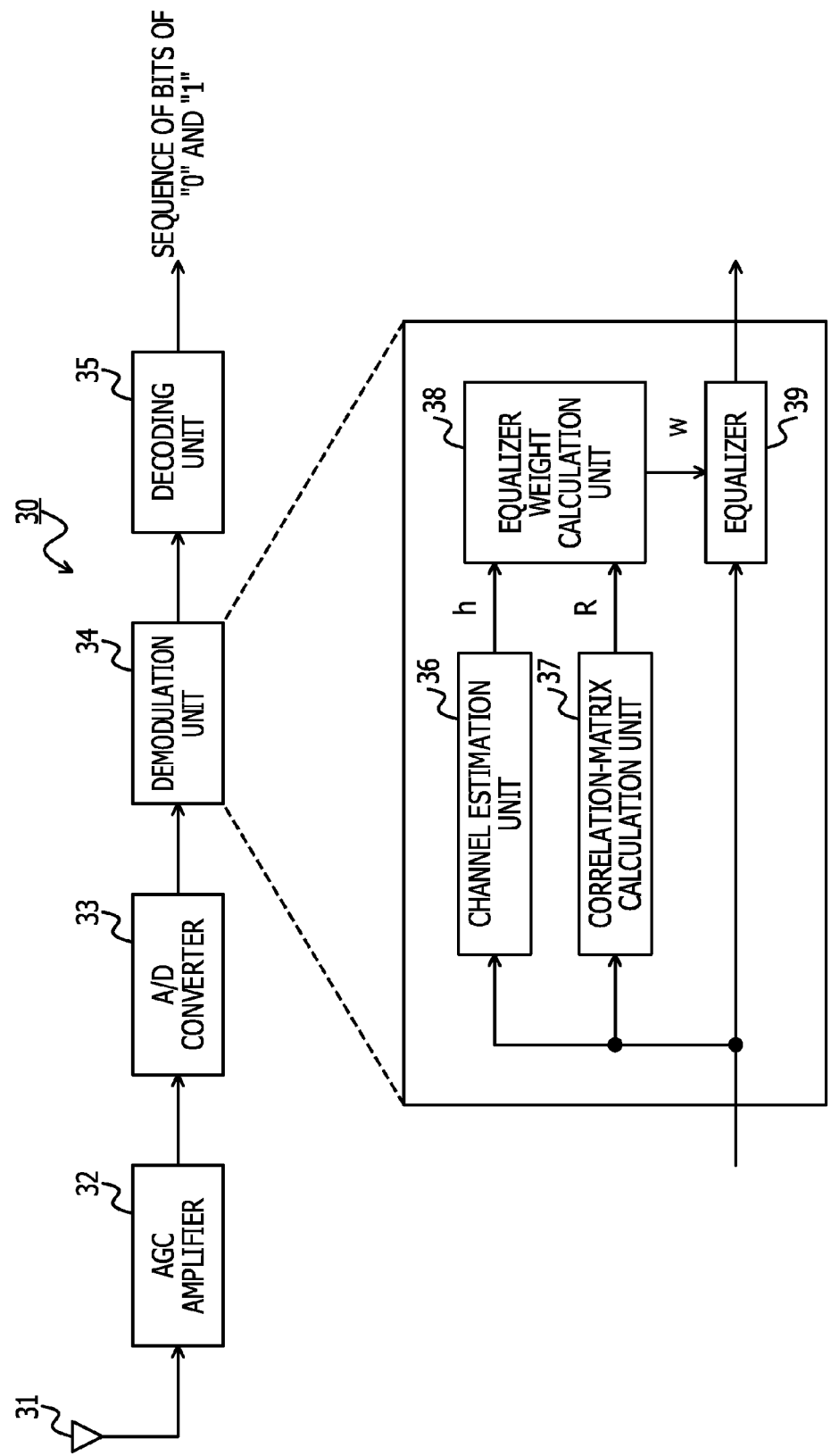

ARITHMETIC DEVICE, ARITHMETIC METHOD, AND WIRELESS COMMUNICATION DEVICE

CROSS-REFERENCE TO RELATED APPLICATION

This application is based upon and claims the benefit of priority of the prior Japanese Patent Application No. 2014-007112, filed on Jan. 17, 2014, the entire contents of which are incorporated herein by reference.

FIELD

The embodiments discussed herein are related to an arithmetic device, an arithmetic method, and a wireless communication device.

BACKGROUND

As approaches used to solve systems of linear equations using iterative methods (or iterative operations), the Gauss-Seidel method and the Gauss-Jacobi method are known in the related art. In the analysis of a water pipe network by using a circuit simulator, there is known a technique in which a virtual state equation is solved by using the Gauss-Seidel method (for example, see Japanese Laid-open Patent Publication No. 10-320444).

SUMMARY

According to an aspect of the invention, an arithmetic device includes a plurality of parallel processors, and a processor configured to control the plurality of parallel processors so as to calculate an approximate solution of an equation by using a first algorithm and a second algorithm switchably, each of the first algorithm and the second algorithm being algorithms providing an iterative method, the second algorithm causing a divergence more likely than the first algorithm, the second algorithm being performed more efficiently by the plurality of parallel processors than the first algorithm, the first algorithm and the second algorithm being switched each other between at least one pair of iterative steps of the iterative method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3B is a block diagram illustrating an example of a flow of signals in the wireless receiver illustrated in FIG. 3A;

DESCRIPTION OF EMBODIMENTS

However, in the foregoing related-art technique, in cases where approximate solutions to a linear equation are obtained by an iterative method using a parallel processor, if an iterative method with which approximate solutions is unlikely to diverge, the parallel processing efficiency is low, whereas if an iterative method with which the efficiency of parallel processing is high, the approximate solutions diverge in some cases.

In one aspect, an object of the present disclosure is to provide an arithmetic device, an arithmetic method, and a wireless communication device that may improve parallel efficiency while suppressing the divergence.

Hereinafter, embodiments of an arithmetic device, an arithmetic method, and a wireless communication device according to the present disclosure will be described in detail with reference to the accompanying drawings.

First Embodiment

Figure 1A:
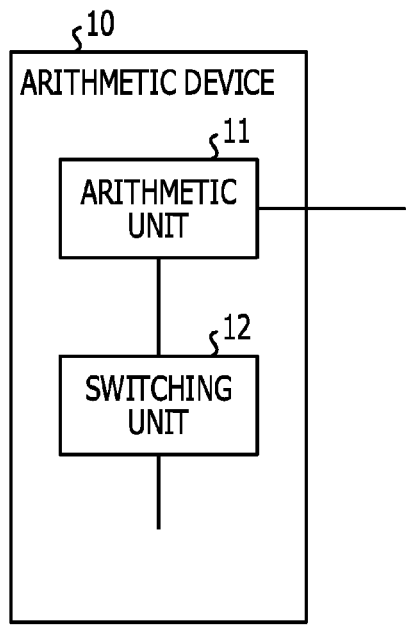
FIG. 1A is a block diagram illustrating an example of an arithmetic device according to a first embodiment.
Figure 1B:
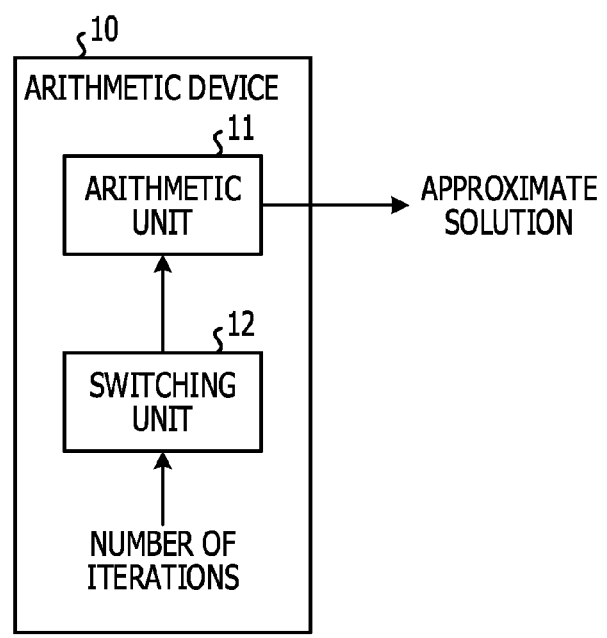
FIG. 1B is a block diagram illustrating an example of a flow of signals in the arithmetic unit illustrated in FIG. 1A.

FIG. 1A is a block diagram illustrating an example of an arithmetic device according to a first embodiment. FIG. 1B is a block diagram illustrating an example of a flow of signals in the arithmetic unit illustrated in FIG. 1A. As illustrated in FIG. 1A and FIG. 1B, an arithmetic device 10 according to the first embodiment includes an arithmetic unit 11 and a switching unit 12.

The arithmetic unit 11 is an arithmetic unit that obtains approximate solutions to (a system of) linear equations by performing an iterative method using a parallel processor.

The arithmetic unit 11 outputs an approximate solution obtained, for example, at every iteration step of the iterative method.

The switching unit 12 is a switching unit that alternately switches the iterative method performed by the arithmetic unit 11 between a first algorithm and a second algorithm, in accordance with the number of iterative steps of the iterative method. Examples of switching include switching that is performed once for each iteration step of the operation, and switching that is performed once for each plurality of iterative steps of the operation. Further, the iterative method may be alternately and switched in such a manner that the first algorithm and the second algorithm are not uniformly repeated, for example, the first algorithm, the second algorithm, the second algorithm, the first algorithm and the second algorithm, the second algorithm, . . . . Further, switching is not limited to the case where only the first algorithm and the second algorithm are used, and a third algorithm may further be used for switching.

The second algorithm is an update algorithm in which the divergence of approximate solutions is more likely to occur (the convergence is poor) and parallel processing efficiency is higher than in the first algorithm. The update algorithm in which divergence is likely to occur is, for example, an update algorithm in which the spectral radius of an iterative matrix is large. The spectral radius of an iterative matrix is described below. The update algorithm in which parallel processing efficiency is high is, for example, an update algorithm in which the number of operations that are concurrently executable with a parallel processor is large.

In such a way, a plurality of algorithms that differ from one another in convergence and in parallel processing efficiency are alternately switched in accordance with the number of iterative steps of an iterative method. This makes it possible to improve the efficiency of parallel processing while suppressing the divergence of approximate solutions.

<Example of Update Algorithm>

By way of example, it may be assumed that the first algorithm is an update algorithm of the Gauss-Seidel method, and the second algorithm is an update algorithm of the Gauss-Jacobi method. The update algorithms of the Gauss-Seidel method and the Gauss-Jacobi method are switched to each other in accordance with the number of iterative steps of an iterative method. This makes it possible to improve the efficiency of parallel processing while suppressing the divergence of approximate solutions.

Alternatively, the first algorithm may be assumed to be an update algorithm using an arithmetic expression that corresponds to one vector representing approximate solutions, and the second algorithm may be assumed to be an update algorithm using arithmetic expressions that correspond to a plurality of vectors into which the vector representing approximate solutions is divided. The update algorithm using an arithmetic expression that corresponds to one vector representing approximate solutions is, by way of example, an update algorithm of the Gauss-Seidel method.

The update algorithm using arithmetic expressions that correspond to a plurality of vectors into which the vector representing approximate solutions is divided may be, for example, one obtained by modifying the update algorithm of the Gauss-Seidel method. The update algorithm using arithmetic expressions that correspond to a plurality of vectors into which the vector representing approximate solutions is divided is an update algorithm in which divergence is more likely to occur and the parallel processing efficiency is higher compared with the update algorithm using an arithmetic expression that corresponds to one vector representing approximate solutions. Additionally, this update algorithm is an update algorithm in which convergence is more likely to occur than, for example, the update algorithm of the Gauss-Jacobi method. For this reason, it is possible to improve parallel processing efficiency while providing better suppression of the divergence of approximate solutions.

<Modification>

The switching unit 12 may determine whether or not a linear equation satisfies a predetermined condition that approximate solutions resulting from an iterative method using the second algorithm converge every time. Then, based on the determination result, the switching unit 12 maintains the second algorithm, regardless of the number of iterative steps of the arithmetic unit 11, during a period when the linear equation satisfies the predetermined condition. This may provide better improvement in parallel processing efficiency in a situation where approximate solutions do not diverge even when the second algorithm is used.

Second Embodiment (Arithmetic Device According to Second Embodiment)

Figure 2A:
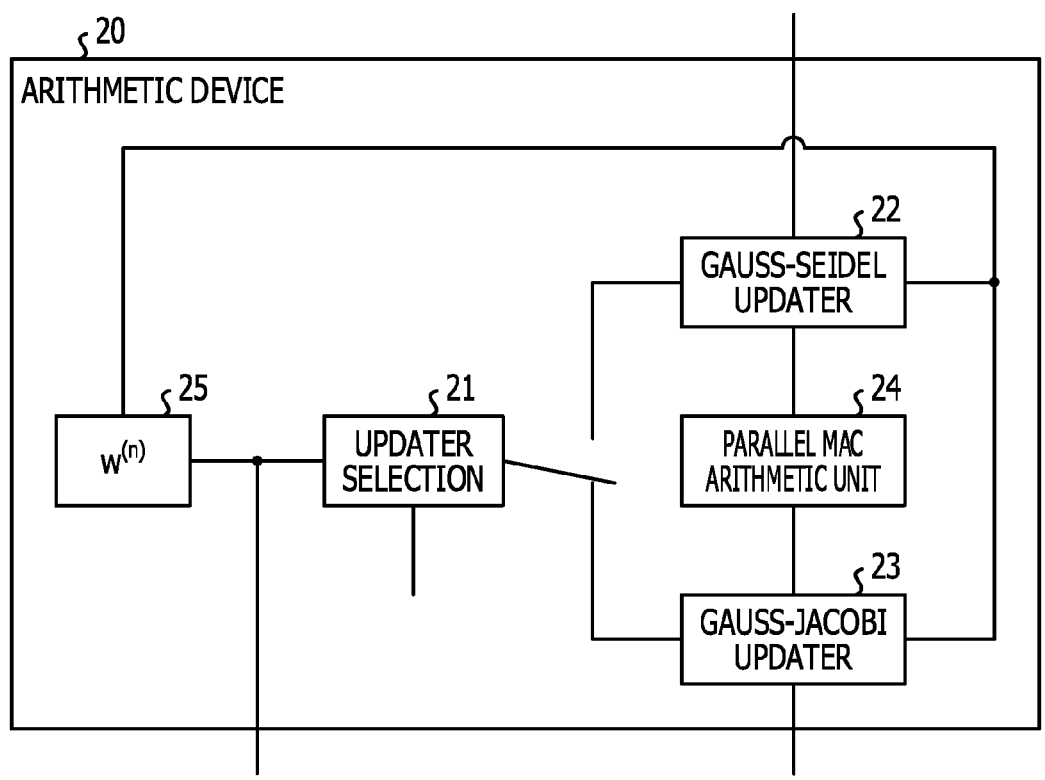
FIG. 2A is a block diagram illustrating an example of an arithmetic device according to a second embodiment.
Figure 2B:
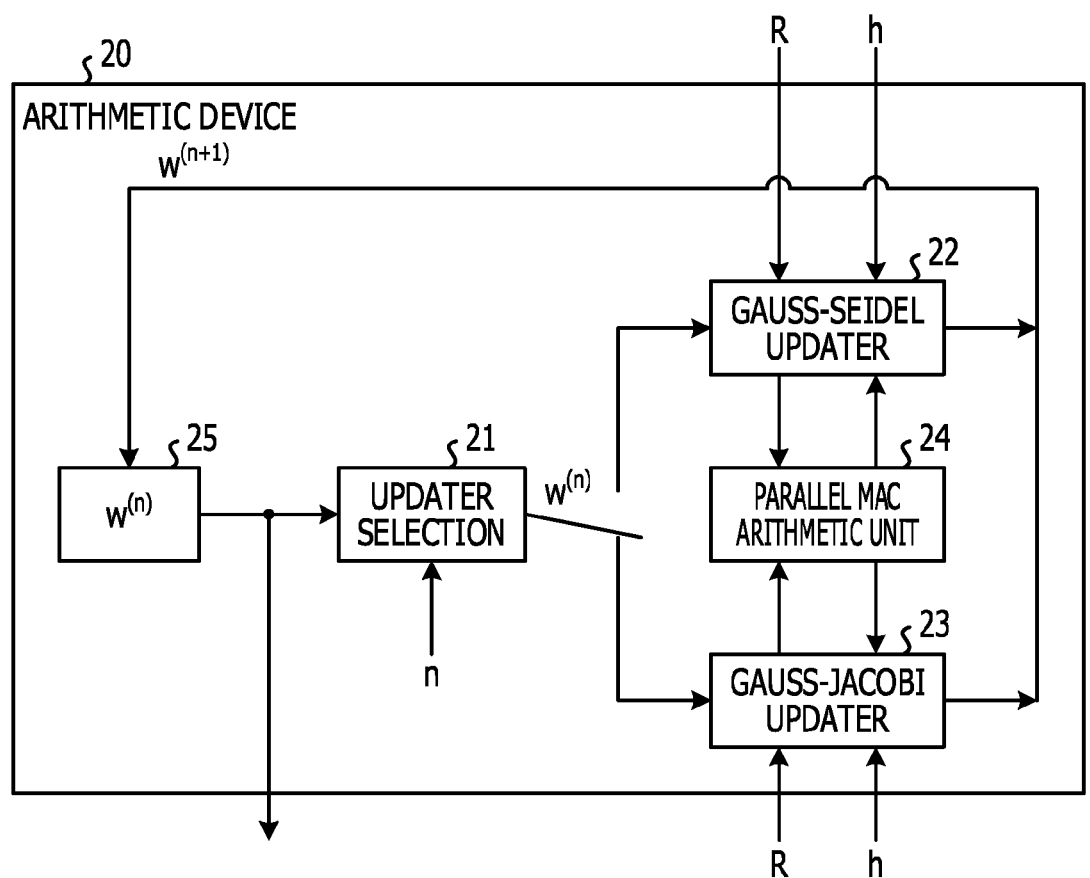
FIG. 2B is a block diagram illustrating an example of a flow of signals in the arithmetic device illustrated in FIG. 2A.

FIG. 2A is a block diagram illustrating an example of an arithmetic device according to a second embodiment. FIG. 2B is a block diagram illustrating an example of a flow of signals in the arithmetic device illustrated in FIG. 2A. As illustrated in FIG. 2A and FIG. 2B, an arithmetic device 20 according to the second embodiment includes an updater selection 21, a Gauss-Seidel updater 22, a Gauss-Jacobi updater 23, a parallel MAC arithmetic unit 24, and a weight retaining unit ($w^{(n)}$) 25. The arithmetic device 20 is provided in, for example, a wireless receiver and is an arithmetic device that calculates a composite weight of an equalizer that performs equalization processing of received signals.

The arithmetic device 10 illustrated in FIG. 1A and FIG. 1B may be implemented by, for example, the arithmetic device 20. The arithmetic unit 11 illustrated in FIG. 1A and FIG. 1B may be implemented by, for example, the Gauss-Seidel updater 22, the Gauss-Jacobi updater 23, and the parallel MAC arithmetic unit 24. The switching unit 12 illustrated in FIG. 1A and FIG. 1B may be implemented by, for example, the updater selection 21.

A weight vector $w^{(n)}$ output from the weight retaining unit 25 and the number of iterative steps n of an operation of the weight vector $w^{(n)}$ are input to the updater selection 21. The updater selection 21 periodically selects either the Gauss-Seidel updater 22 or the Gauss-Jacobi updater 23 in accordance with the number of iterative steps n. Then, the updater selection 21 outputs, to the selected updater, the weight vector $w^{(n)}$ output from the weight retaining unit 25.

Once the weight vector $w^{(n)}$ is output from the updater selection 21, the Gauss-Seidel updater 22 updates operation data in an iterative method in the parallel MAC operation unit 24, based on a square matrix R, a steering vector h, and the weight vector $w^{(n)}$. The Gauss-Seidel updater 22 also updates the operation data by using the update algorithm of the Gauss-Seidel method. Then, the Gauss-Seidel updater 22 acquires a weight vector $w^{(n+1)}$ calculated by the parallel MAC operation unit 24 based on the updated operation data, and outputs the acquired weight vector $w^{(n+1)}$ to the weight retaining unit 25.

Once the weight vector $w^{(n)}$ is output from the updater selection 21, the Gauss-Jacobi updater 23 updates operation data in an iterative method in the parallel MAC operation unit 24, based on the square matrix R, the steering vector h, and the weight vector $w^{(n)}$. The Gauss-Jacobi updater 23 also updates the operation data by using the update algorithm of the Gauss-Jacobi method. Then, the Gauss-Jacobi updater 23 acquires the weight vector $w^{(n+1)}$ calculated by the parallel MAC operation unit 24 based on the updated operation data, and outputs the acquired weight vector $w^{(n+1)}$ to the weight retaining unit 25.

The parallel MAC operation unit 24 includes parallel multiply and accumulation (MAC) operators. The parallel MAC operation unit 24 calculates the weight vector $w^{(n+1)}$ based on operation data updated by the Gauss-Seidel updater 22 or the Gauss-Jacobi updater 23 by using the parallel MAC operators. Then, the parallel MAC operation unit 24 returns the calculation result to the Gauss-Seidel updater 22 or the Gauss-Jacobi updater 23.

The weight retaining unit 25 retains the weight vector $w^{(n+1)}$ output from the Gauss-Seidel updater 22 or the Gauss-Jacobi updater 23. Then, the weight retaining unit 25 outputs the retained weight vector $w^{(n+1)}$ as a weight vector $w^{(n)}$ in the next operation period. The weight vector $w^{(n)}$ output from the weight retaining unit 25 is output as an operation result of the arithmetic device 20 and is also input to the updater selection 21.

With the arithmetic device 20 illustrated in FIG. 2A and FIG. 2B, the update algorithm of the Gauss-Seidel method and the update algorithm of the Gauss-Jacobi method may be switched periodically. Thus, partially using the update algorithm of the Gauss-Jacobi method increases the efficiency of parallel processing. In addition, under such a condition that the divergence would occur if the Gauss-Jacobi method is used throughout the process, a convergent state may be stably maintained by using the update algorithm of the Gauss-Seidel method from the middle of the process. For this reason, the efficiency of parallel processing and the convergence may be improved.

(Operations of Arithmetic Device)

Figure 2C:
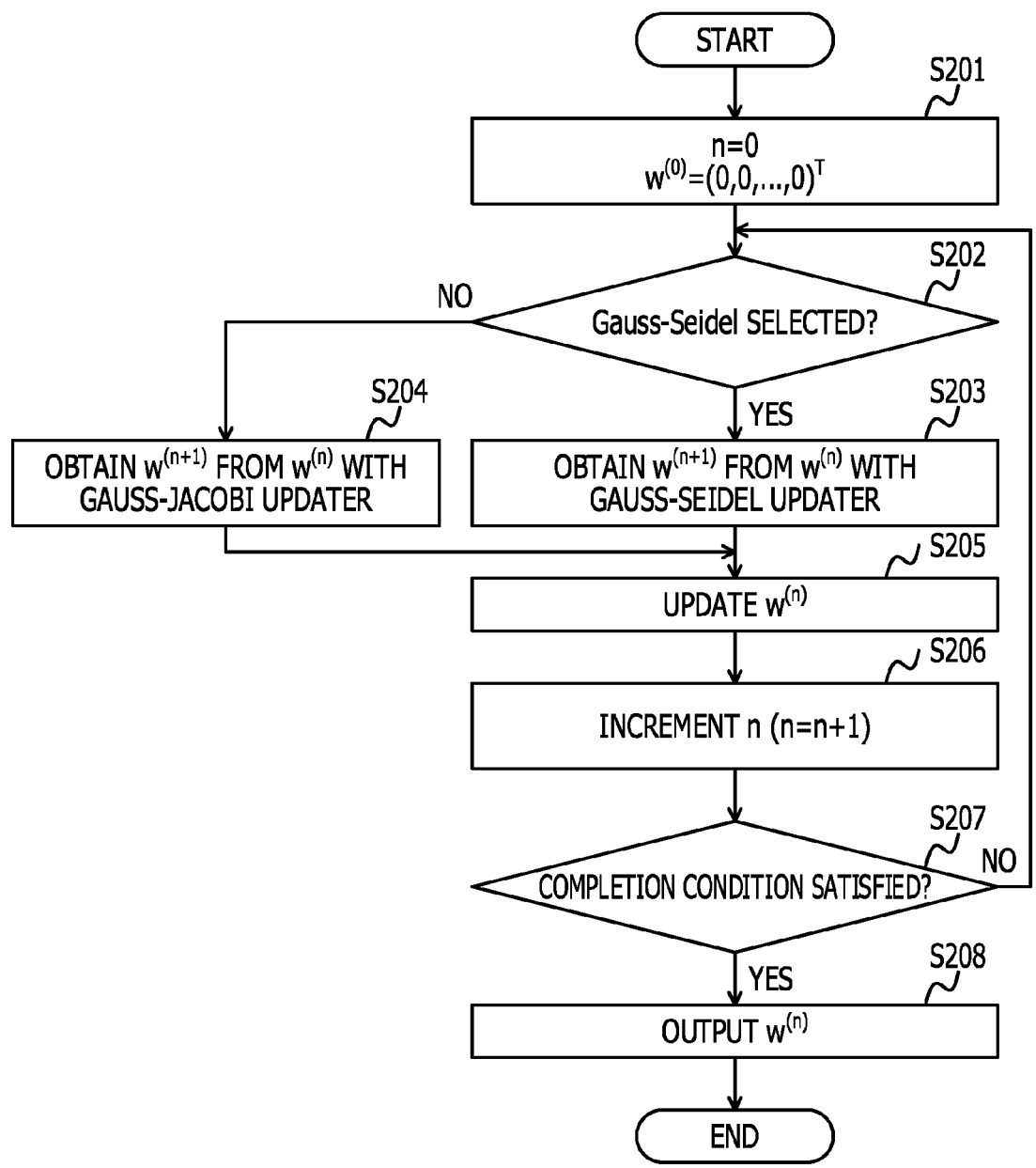
FIG. 2C is a flowchart illustrating an example of operations of the arithmetic device.

FIG. 2C is a flowchart illustrating an example of operations of the arithmetic device. The arithmetic device 20 illustrated in FIG. 2A and FIG. 2B performs steps illustrated in, for example, FIG. 2C. First, the arithmetic device 20 initializes (n=0, $w^{(0)}=(0, 0, \ldots, 0)^T$) the number of iterative steps n and a weight vector $w^{(0)}$ (step S201).

Next, the arithmetic device 20 determines whether or not the updater selection 21 has selected the Gauss-Seidel (the Gauss-Seidel updater 22) (step S202). If the updater selection 21 has selected the Gauss-Seidel (step S202: YES), the arithmetic device 20 obtains a weight vector $w^{(n+1)}$ from the weight vector $w^{(n)}$ with the Gauss-Seidel updater 22 (step S203), and proceeds to step S205. If the updater selection 21 has selected the Gauss-Jacobi (the Gauss-Jacobi updater 23) (step S202: NO), the arithmetic device 20 obtains the weight vector $w^{(n+1)}$ from the weight vector $w^{(n)}$ with the Gauss-Jacobi updater 23 (step S204).

Next, the arithmetic device 20 updates the weight vector $w^{(n)}$ by replacing it with the weight vector $w^{(n+1)}$ obtained in step S203 or step S204 with the parallel MAC operation unit 24 (step S205). Then, the arithmetic device 20 increments (n=n+1) the number of iterative steps n (step S206).

Next, the arithmetic device 20 determines whether or not a predetermined completion condition has been satisfied (step S207). It may be assumed that the predetermined completion condition is, for example, that the number of iterative steps n has reached a predetermined number of times. If the predetermined completion condition has not been satisfied (step S207: NO), the arithmetic device 20 returns to step S202. If the completion condition has been satisfied (step S207: YES), the arithmetic device 20 outputs the weight vector $w^{(n)}$ (step S208), and a series of operations is completed.

Alternatively, the order of step S207 and step S208 may be interchanged, so that the arithmetic device 20 outputs the weight vector $w^{(n)}$ each time an iterative method is performed until the predetermined completion condition is satisfied.

Since the updater selection 21 selects either the Gauss-Seidel updater 22 or the Gauss-Jacobi updater 23 in accordance with the number of iterative steps n, the steps described above allows each update algorithm to be switched in accordance with the number of iterative steps n.

(Wireless Receiver to which Arithmetic Device is Applied)

Figure 3A:
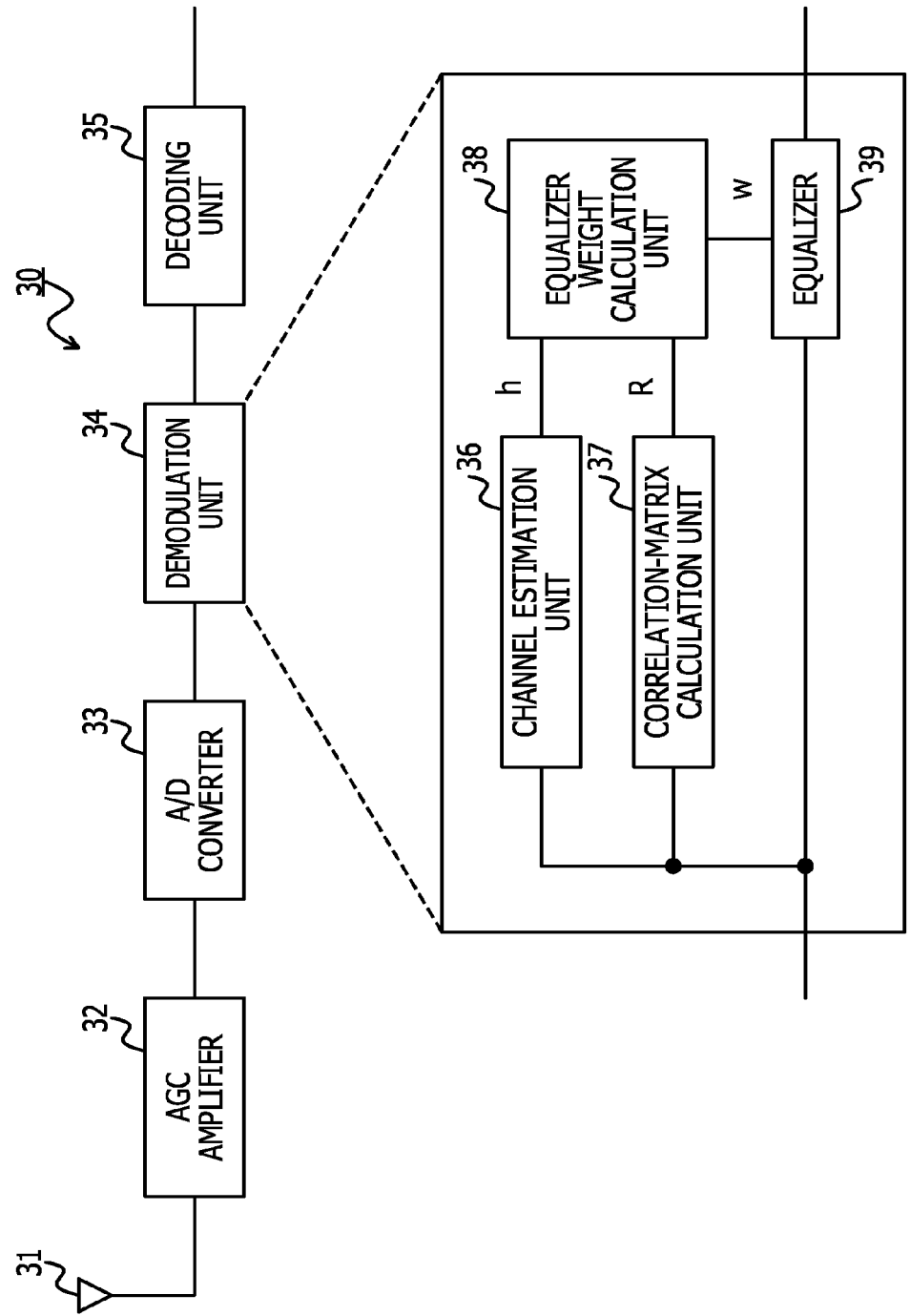
FIG. 3A is a block diagram illustrating an example of a wireless receiver to which the arithmetic device is applied.

FIG. 3A is a block diagram illustrating an example of a wireless receiver to which an arithmetic device is applied. FIG. 3B is a block diagram illustrating an example of a flow of signals in the wireless receiver illustrated in FIG. 3A. The arithmetic device 20 illustrated in FIG. 2A and FIG. 2B is applicable to a wireless receiver 30 illustrated, for example, in FIG. 3A and FIG. 3B. The wireless receiver 30 is a wireless communication device including an antenna 31, an automatic-gain-control (AGC) amplifier 32, an analog-to-digital (A/D) converter 33, a demodulation unit 34, and a decoding unit 35.

The antenna 31 receives a signal wirelessly transmitted, and outputs the received signal to the AGC amplifier 32. The AGC amplifier 32 performs automatic gain control (AGC) so as to amplify a signal output from the antenna 31 with a fixed gain. Then, the AGC amplifier 32 outputs the amplified signal to the A/D converter 33.

The A/D converter 33 converts the signal output from the AGC amplifier 32 from an analog signal to a digital signal. Then, the A/D converter 33 outputs the signal, which has been converted to the digital signal, to the demodulation unit 34.

The demodulation unit 34 performs demodulation processing of the signal output from the A/D converter 33. Then, the demodulation unit 34 outputs a sequence of soft-decision bits obtained by demodulation processing to the decoding unit 35. Equalization processing, for example, is included in demodulation processing performed by the demodulation unit 34. For example, the demodulation unit 34 includes a channel estimation unit 36, a correlation-matrix calculation unit 37, an equalizer weight calculation unit 38, and an equalizer 39.

The channel estimation unit 36 performs channel estimation based on the signal output from the A/D converter 33. Then, the channel estimation unit 36 outputs a result of channel estimation as the steering vector h mentioned above to the equalizer weight calculation unit 38.

The correlation-matrix calculation unit 37 calculates a correlation matrix based on the signal output from the A/D converter 33. Then, the correlation-matrix calculation unit 37 outputs the calculated correlation matrix as the square matrix R mentioned above to the equalizer weight calculation unit 38.

The equalizer weight calculation unit 38 calculates a composite weight in the equalizer 39 based on the steering vector h output from the channel estimation unit 36 and the square matrix R output from the correlation-matrix calculation unit 37. Then, the equalizer weight calculation unit 38 outputs the calculated composite weight to the equalizer 39. The arithmetic device 20 illustrated in FIG. 2A and FIG. 2B is applicable to, for example, the equalizer weight calculation unit 38.

The equalizer 39 performs equalization processing on the signal output from the A/D converter 33 based on the composite weight output from the equalizer weight calculation unit 38. Then, the equalizer 39 outputs the signal subjected to the equalization processing to the decoding unit 35.

The decoding unit 35 performs decoding processing based on the sequence of soft-decision bits output from the demodulation unit 34. in the decoding processing performed by the decoding unit 35, error correction processing and other processing, for example, are included. The decoding unit 35 outputs a sequence of bits of "0" and "1" obtained by decoding processing.

Note that the wireless receiver 30 may further include analog elements, such as a duplexer, a filter, a downconverter, and a low noise amplifier (LNA), for example, between the antenna 31 and the A/D converter 33.

(Approximate Method of Linear Equation by Using Each Algorithm)

Next, description will be given of approximate methods based on the Gauss-Seidel method and the Gauss-Jacobi method of Rw=h, which is a linear equation. In this equation, w is a weight vector (for example, a composite weight vector of an equalizer), which serves as, for example, an approximate solution; R is a correlation matrix and is also a square matrix of N×N; and h is a steering vector. A correlation matrix R and the steering vector h are given, for example, from outside the arithmetic device 20.

Figure 4A:
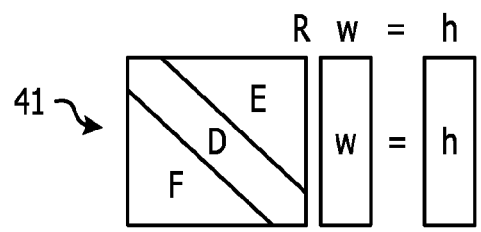
FIG. 4A is an illustration depicting an example of block division of a linear equation.

FIG. 4A is an illustration depicting an example of block division of a linear equation. The linear equation Rw=h may be expressed by, for example, an equation 41 depicted in FIG. 4A. In the equation 41, D is a diagonal matrix obtained by extracting only diagonal elements of the correlation matrix R. E is an upper triangular matrix of the correlation matrix R. F is a lower triangular matrix of the correlation matrix R.

<Approximate Method by Using Gauss-Seidel Method>

First, an approximate method by using the Gauss-Seidel method of the linear equation Rw=h is described. In the Gauss-Seidel method, an update equation (arithmetic expression) of the weight vector w is used. The update equation is obtained by transforming equation 41 into equation (1) given below. Then, the weight vectors $w^{(n)}$ are sequentially calculated beginning from a weight vector $w^{(0)}$ of a suitable initial value, and thus the weight vector w is approximately obtained.

$$w^{(n+1)} = D^{-1}(h - Ew^{(n)} - Fw^{(n+1)}) \quad (1)$$

While the above update equation (1) is an equation where a weight vector $w^{(n+1)}$ in the left-hand side is obtained from the weight vector $w^{(n)}$, the weight vector $w^{(n+1)}$ is included in the right-hand side of equation (1). Here, the above equation (1) may be rewritten into the following equations (2). In equations (2), $w_0^{(n+1)}$, $w_1^{(n+1)}$, $w_2^{(n+1)}$, ... are elements of the weight vector $w^{(n+1)}$.

$$w_0^{(n+1)} = (1/R_{00})(h_0 - R_{01}w_1^{(n)} - R_{02}w_2^{(n)} - R_{03}w_3^{(n)} \cdots - R_{0N}w_N^{(n)})$$
$$w_1^{(n+1)} = (1/R_{11})(h_1 - R_{10}w_0^{(n+1)} - R_{12}w_2^{(n)} - R_{13}w_3^{(n)} \cdots - R_{1N}w_N^{(n)}) \quad (2)$$
$$w_2^{(n+1)} = (1/R_{22})(h_2 - R_{20}w_0^{(n+1)} - R_{21}w_1^{(n+1)} - R_{23}w_3^{(n)} \cdots - R_{2N}w_N^{(n)})$$
$$\vdots$$

As expressed in the above equations (2), the weight $w_0^{(n+1)}$, for example, may be calculated since a weight $w_x^{(n+1)}$ is not included in the right-hand side of the equation for the weight $w_0^{(n+1)}$. Although the weight $w_0^{(n+1)}$ is included in the right-hand side of the equation for the weight $w_1^{(n+1)}$, the weight $w_1^{(n+1)}$ may be calculated after the weight $w_0^{(n+1)}$ is calculated.

In such a way, in the Gauss-Seidel method, by sequentially calculating individual equations of the above equations (2) from the top, the weight vector $w^{(n)}$ may be calculated even for the above equation (1) including the weight vector $w^{(n+1)}$ in the right-hand side. However, individual equations of the above equations (2) have to be sequentially calculated. This means that it is impracticable to simultaneously calculate the individual equations. Therefore, the efficiency of parallel processing performed using a parallel processor is low.

<Approximate Method by Using Gauss-Jacobi Method>

Next, an approximate method by using the Gauss-Jacobi method of the linear equation Rw=h is described. In the Gauss-Jacobi method, an update equation (arithmetic expression) of the weight vector w is used. The update equation is obtained by transforming the equation 41 into an equation (3) given below. Then, weight vectors $w^{(n)}$ are sequentially calculated beginning from the weight vector $w^{(0)}$ of a suitable initial value, and thus the weight vector w is approximately obtained.

$$w^{(n+1)} = D^{-1}(h - (E+F)w^{(n)}) \quad (3)$$

In the above update equation (3), the weight vector $w^{(n+1)}$ is not included in the right-hand side. Consequently, in the Gauss-Jacobi method, no restrictions are placed on the order in which the operations of elements $w_0^{(n+1)}$, $w_1^{(n+1)}$, $w_2^{(n+1)}$, ... of the weight vector $w^{(n+1)}$ are performed. Therefore, the efficiency of parallel processing performed using a parallel processor is low. However, in the Gauss-Jacobi method, the divergence is more likely to occur than in the Gauss-Seidel method.

<Convergence of Update Algorithm>

The update equation of the Gauss-Seidel method expressed as, for example, the above equation (1) may be transformed into, for example, $M^{(N+1)} = Mw^{(n)} + C$, where $M = -(D+F)^{-1}E)$. This "M" denotes an iterative matrix, and the absolute value of the maximum eigenvalue of M is referred to as a "spectral radius". If the spectral radius is smaller than 1, w will converge. In addition, the smaller the spectral radius, the faster w converges. Accordingly, an update algorithm in which divergence is likely to occur is, for example, an update algorithm in which the spectral radius of an iterative matrix is large.

(Approximate Solution in Each Algorithm)

Figure 4B:
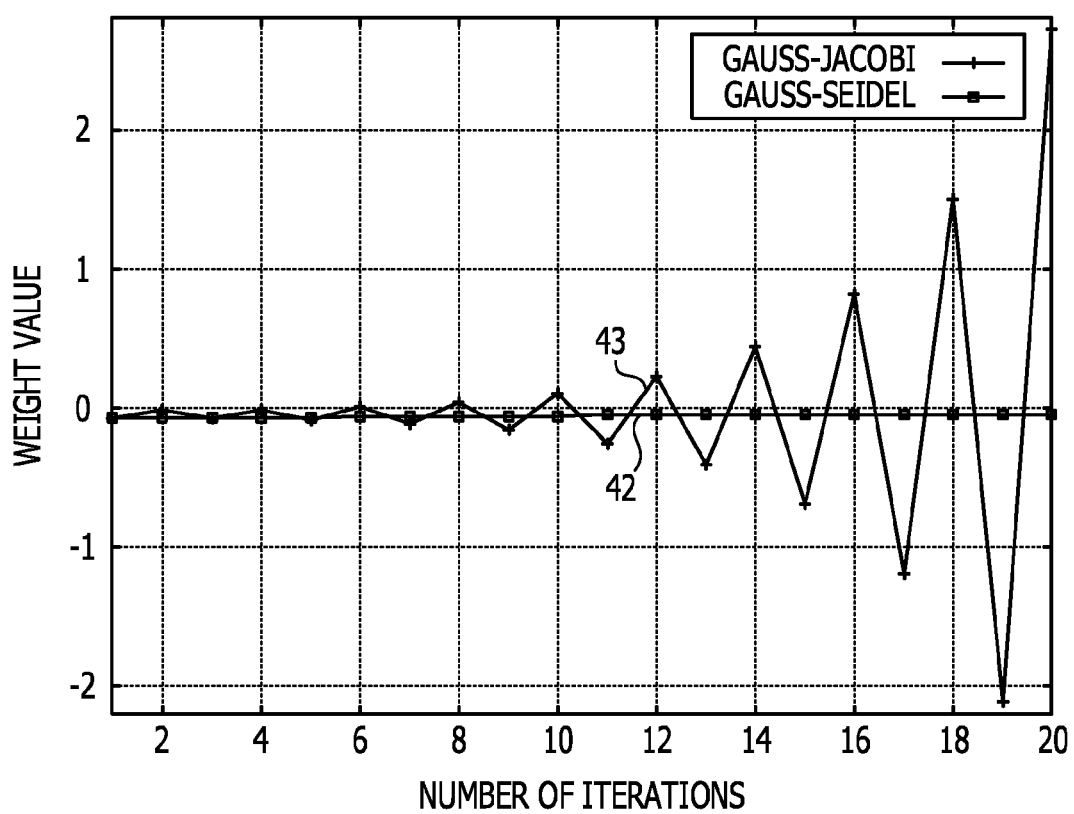
FIG. 4B is a graph depicting an example of approximate solutions in each algorithm.

FIG. 4B is a graph depicting an example of approximate solutions in each algorithm. In FIG. 4B, the horizontal axis (Number of iterative steps) represents the number of iterative steps n of an operation. The vertical axis (Weight value) represents the composite weight calculated as an approximate solution. Operation results 42 and 43 indicate operation results of approximate solutions (composite weights) with respect to the number of iterative steps in a propagation environment with three paths at equal levels, for example, in cases where the algorithms are applied to the equalizer weight calculation unit 38 of the wireless receiver 30 illustrated in FIG. 3A and FIG. 3B.

The operation result 42 (Gauss-Seidel) indicates the operation result in the Gauss-Seidel method. The operation result 43 (Gauss-Jacobi) indicates the operation result in the Gauss-Jacobi method. As indicated by the operation results 42 and 43, in the Gauss-Jacobi method, approximate solutions are likely to diverge compared with that in the Gauss-Seidel method. For this reason, even supposing that only either the Gauss-Seidel method or the Gauss-Jacobi method is used, coexistence of the convergence of approximate solutions and the efficiency of parallel processing are impracticable.

In contrast, the arithmetic device 20 may periodically switch the update algorithm of the Gauss-Seidel method and the update algorithm of the Gauss-Jacobi method in accordance with the number of iterative steps. Thus, the convergence of approximate solutions and the efficiency of parallel processing may be improved.

(Hardware Configuration of Arithmetic Device)

Figure 5A:
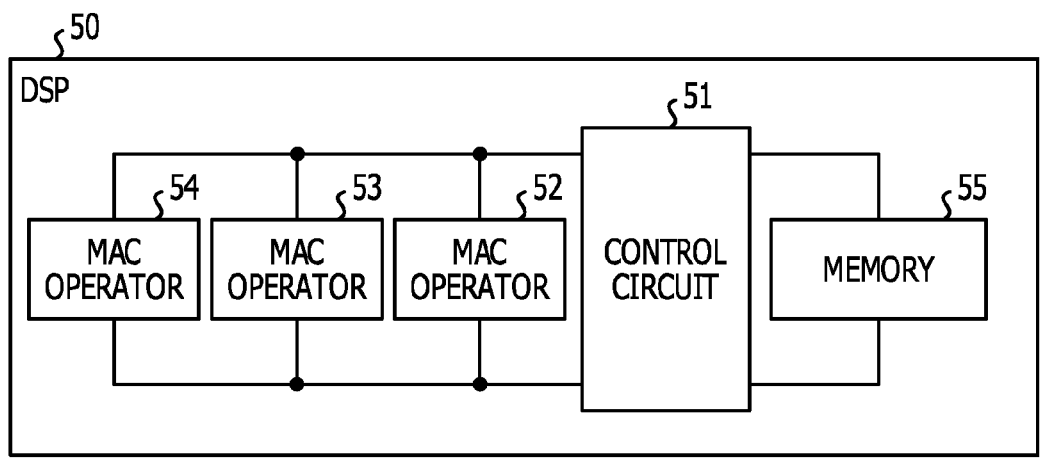
FIG. 5A is a block diagram illustrating an example of a hardware configuration of an arithmetic device.
Figure 5B:
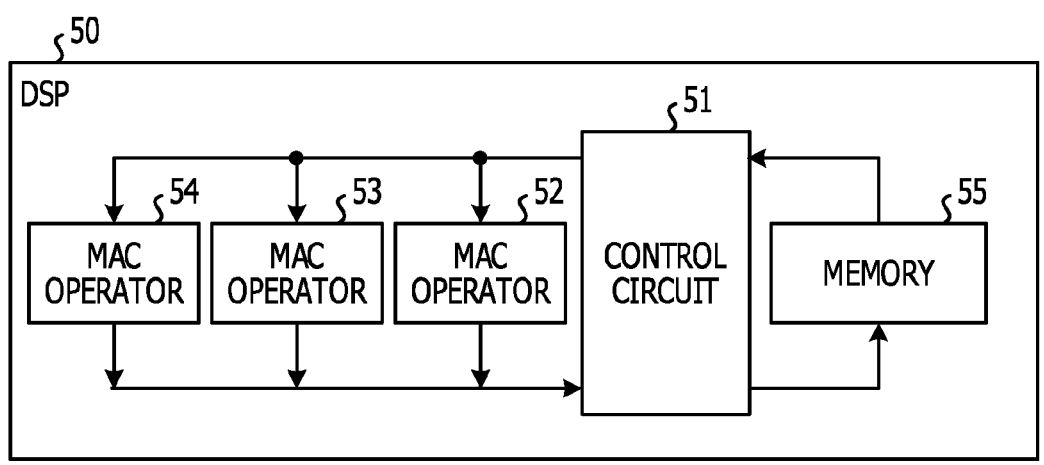
FIG. 5B is a block diagram illustrating an example of a flow of signals in the hardware configuration of the arithmetic device illustrated in FIG. 5A.

FIG. 5A is a block diagram illustrating an example of a hardware configuration of an arithmetic device. FIG. 5B is a block diagram illustrating an example of a flow of signals in the hardware configuration of the arithmetic device illustrated in FIG. 5A. The arithmetic device 20 illustrated in FIG. 2A and FIG. 2B may be implemented by, for example, a digital signal processor (DSP) 50 illustrated in FIG. 5A and FIG. 5B.

The DSP 50 includes a control circuit 51, MAC operators 52 to 54, and a memory 55. The updater selection 21, the Gauss-Seidel updater 22, and the Gauss-Jacobi updater 23 illustrated in FIG. 2A and FIG. 2B may be implemented by, for example, the control circuit 51. The parallel MAC operation unit 24 illustrated in FIG. 2A and FIG. 2B may be implemented by, for example, the MAC operators 52 to 54. The weight retaining unit 25 illustrated in FIG. 2A and FIG. 2B may be implemented by, for example, the memory 55. Through control of the control circuit 51, data stored in the memory 55 is calculated by the MAC operators 52 to 54, and the operation result is stored in the memory 55.

Although the example where a DSP is used as a circuit that implements the arithmetic device 20 is described here, the arithmetic device 20 is not limited to the DSP, but may be implemented by various processors such as a field programmable gate array (FPGA). Additionally, although the configuration provided with the three MAC operators 52 to 54 is described here, the parallel processor may be two operators and may also be four or more (for example, 64) operators. Additionally, although the configuration in which the DSP 50 includes the MAC operators 52 to 54 is described here, the MAC operators 52 to 54 may be provided outside the DSP 50.

(Switchover Between Update Algorithms)

Figure 6A:
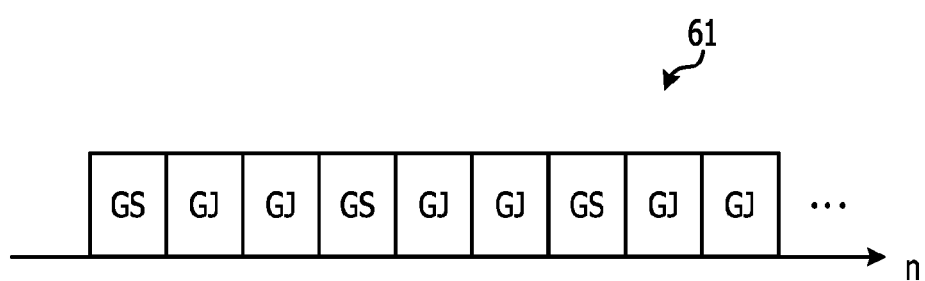
FIG. 6A is an illustration depicting an example of switchover between update algorithms.

FIG. 6A is an illustration depicting an example of switchover between update algorithms. A switching order 61 depicted in FIG. 6A indicates the order in which the update algorithm of the Gauss-Seidel method and the update algorithm of the Gauss-Jacobi method are switched by the updater selection 21.

In the example illustrated in the switching order 61, the updater selection 21 alternately switches one iteration of the update algorithm (GS) of the Gauss-Seidel method and two iterative steps of the update algorithm (GJ) of the Gauss-Jacobi method. Thus, it is expectable that, in a situation where the divergence occurs when the Gauss-Jacobi method is used alone, approximate solutions will remain within the radius of convergence owing to the update algorithm of the Gauss-Seidel method inserted into the middle of the process, and, as a result, convergence will occur.

For example, the updater selection 21 stores information (a table or the like) indicating the switching order 61, and, based on the stored information, switches the update algorithm of the Gauss-Seidel method and the update algorithm of the Gauss-Jacobi method.

Figure 6B:
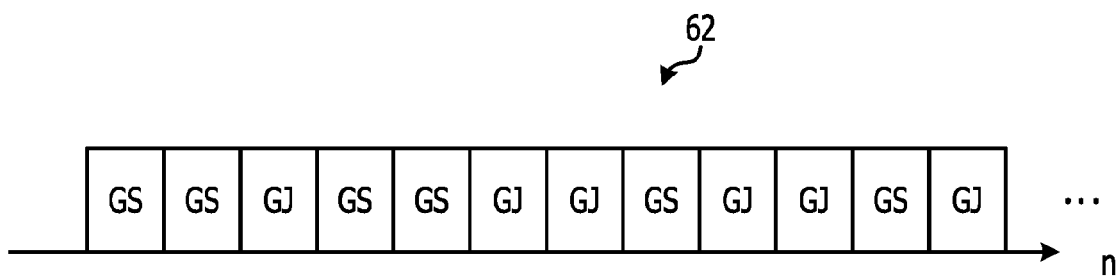
FIG. 6B is an illustration depicting another example of switchover between update algorithms.

FIG. 6B is an illustration depicting another example of switchover between update algorithms. A switching order 62 depicted in FIG. 6B indicates the order in which the update algorithm of the Gauss-Seidel method and the update algorithm of the Gauss-Jacobi method are switched by the updater selection 21.

In the example illustrated in the switching order 62, the updater selection 21 frequently uses the update algorithm (GS) of the Gauss-Seidel method in the first half of a predetermined period T, and frequently uses the update algorithm (GJ) of the Gauss-Jacobi method in the second half of the predetermined period T. Thus, it is expectable that if approximate solutions may converge to some extent in the first half of the predetermined period T, convergence may be successfully achieved in the second half by using the Gauss-Jacobi method with poor convergence. The predetermined period T is one cycle of equalization processing performed by, for example, a wireless receiver.

For example, the updater selection 21 stores information (a table or the like) indicating the switching order 62, and, based on the stored information, switches the update algorithm of the Gauss-Seidel method and the update algorithm of the Gauss-Jacobi method.

(Approximate Solutions in Case of Switching Gauss-Seidel Method and the Gauss-Jacobi Method)

Figure 7:
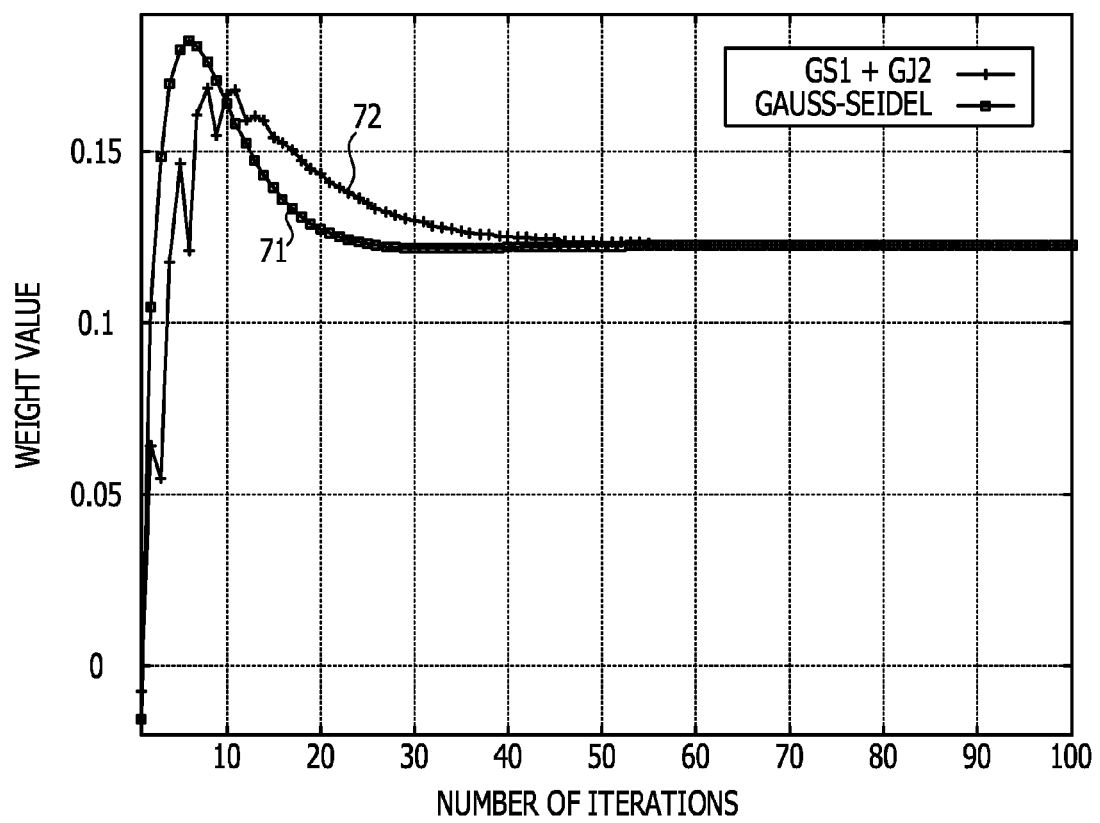
FIG. 7 is a graph depicting an example of approximate solutions in the case where the Gauss-Seidel method and the Gauss-Jacobi method are switched.

FIG. 7 is a graph depicting an example of approximate solutions in the case where the Gauss-Seidel method and the Gauss-Jacobi method are switched. In FIG. 7, the horizontal axis (Number of iterative steps) represents the number of iterative steps n of an operation. The vertical axis (Weight value) represents the composite weight calculated as an approximate solution. Operation results 71 and 72 indicate operation results of approximate solutions (composite weights) with respect to the number of iterative steps, respectively.

The operation result 71 (Gauss-Seidel) indicates an operation result in the Gauss-Seidel method as a reference. The operation result 72 (GS1+GJ2) indicates an operation result in the case where one iteration of the update algorithm (GS) of the Gauss-Seidel method and two iterative steps of the update algorithm (GJ) of the Gauss-Jacobi method are alternately switched (for example, see FIG. 6A).

As illustrated in the operation results 71 and 72, alternately switching the update algorithm (GS) of the Gauss-Seidel method and the update algorithm (GJ) of the Gauss-Jacobi method may cause good convergence similar to that in the case where the Gauss-Jacobi method is used alone. Alternately switching the update algorithm (GS) of the Gauss-Seidel method and the update algorithm (GJ) of the Gauss-Jacobi method may also improve the efficiency of parallel processing compared with the case where the Gauss-Jacobi method is used alone.

In such a way, according to the second embodiment, the update algorithm of the Gauss-Seidel method and the update algorithm of the Gauss-Jacobi method are alternately switched in accordance with the number of iterative steps of an iterative method. This makes it possible to improve the parallel processing efficiency while suppressing the divergence of approximate solutions.

Third Embodiment

Figure 8A:
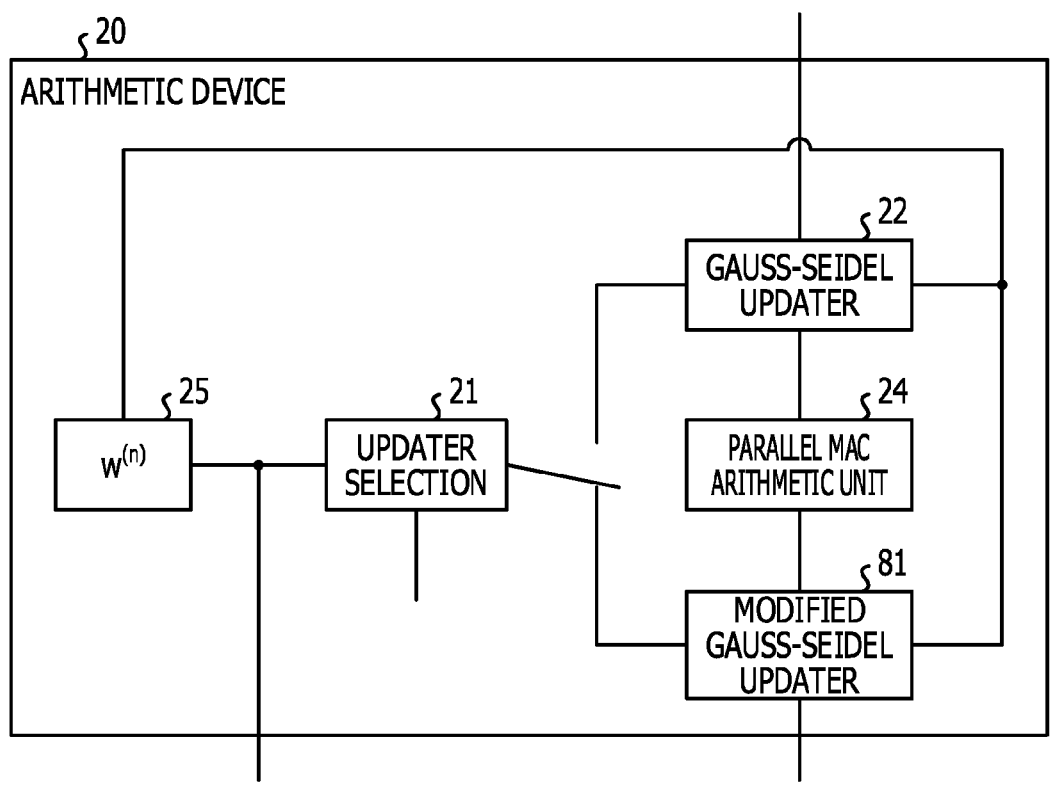
FIG. 8A is a block diagram illustrating an example of an arithmetic device according to a third embodiment.
Figure 8B:
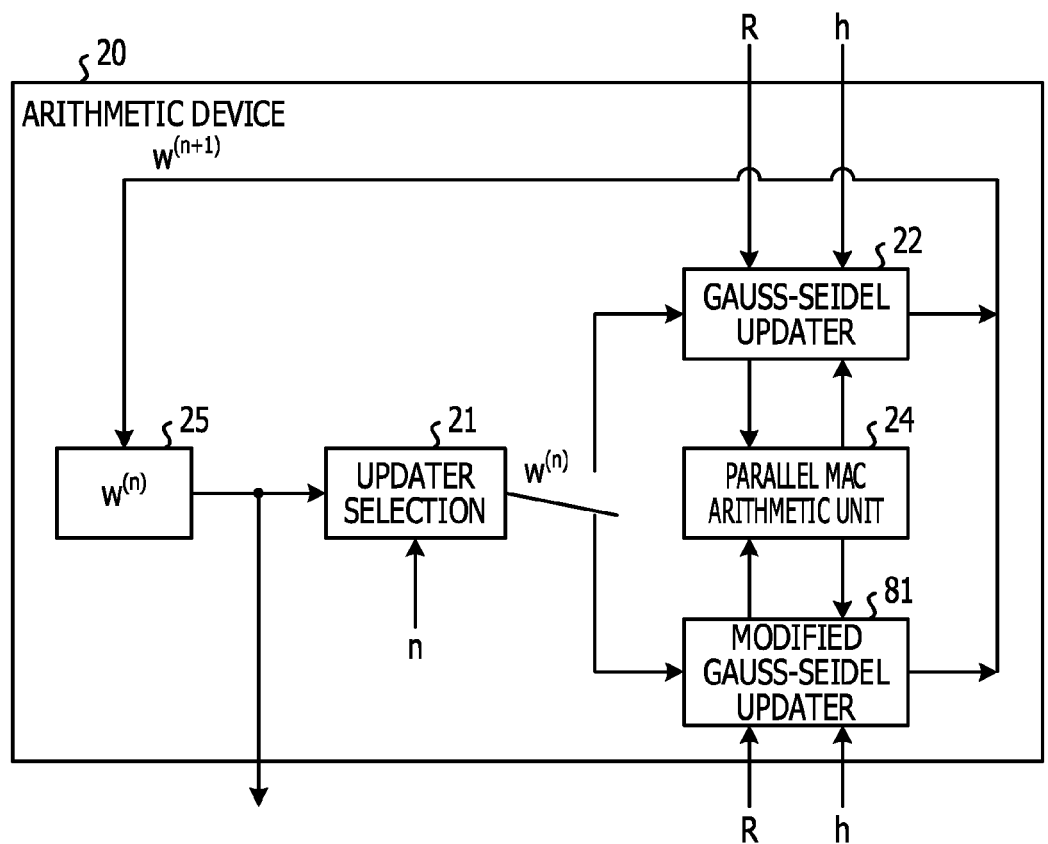
FIG. 8B is a block diagram illustrating an example of a flow of signals in the arithmetic unit illustrated in FIG. 8A.

FIG. 8A is a block diagram illustrating an example of an arithmetic device according to a third embodiment. FIG. 8B is a block diagram illustrating an example of a flow of signals in the arithmetic device illustrated in FIG. 8A. In FIG. 8A and FIG. 8B, components similar to those illustrated in FIG. 2A and FIG. 2B are denoted by the same reference numerals and redundant description thereof is omitted.

As illustrated in FIG. 8A and FIG. 8B, the arithmetic device 20 according to the third embodiment includes a modified Gauss-Seidel updater 81 in place of the Gauss-Jacobi updater 23 illustrated in FIG. 2A and FIG. 2B. The modified Gauss-Seidel updater 81 may be implemented by, for example, the control circuit 51 illustrated in FIG. 5A and FIG. 5B.

Once the weight vector $w^{(n)}$ is output from the updater selection 21, the modified Gauss-Seidel updater 81 updates operation data in an iterative method in the parallel MAC operation unit 24, based on the square matrix R, the steering vector h, and the weight vector $w^{(n)}$. The modified Gauss-Seidel updater 23 also updates the operation data by using the update algorithm of a modified Gauss-Seidel method. The update algorithm of the modified Gauss-Seidel method will be described below (for example, see FIG. 9). Then, the modified Gauss-Seidel updater 81 acquires the weight vector $w^{(n+1)}$, which is calculated by the parallel MAC operation unit 24 based on the updated operation data, and outputs the acquired weight vector $w^{(n+1)}$ to the weight retaining unit 25.

(Approximate Method of Linear Equation by Using Update Algorithm of Modified Gauss-Seidel Method)

Figure 9:
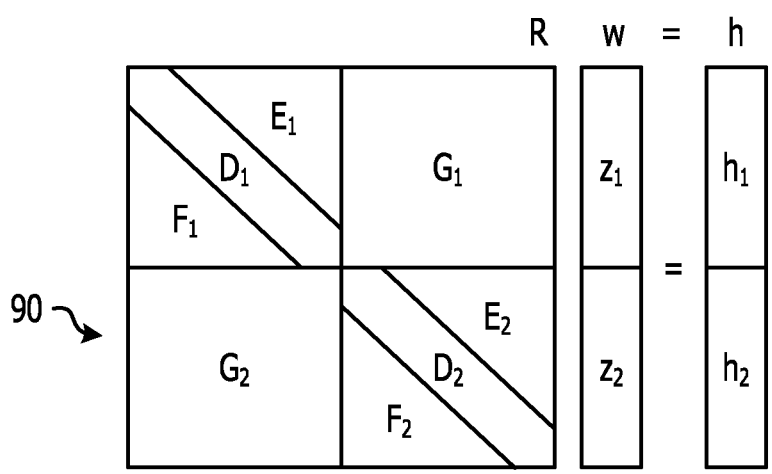
FIG. 9 is an illustration depicting an example of block division of a linear equation.

FIG. 9 is an illustration depicting an example of block division of a linear equation. The linear equation Rw=h may be expressed by, for example, an equation 90 depicted in FIG. 9. In the update algorithm of the modified Gauss-Seidel method, the weight vector w is divided into two blocks, weight vectors $z_1$ and $z_2$. The steering vector h is divided into two blocks correspondingly. The correlation matrix R is also divided into four blocks.

In the modified Gauss-Seidel method, update equations of weight vectors $z_1$ and $z_2$ are used. These update equations are obtained by transforming the equation 90 into an equation (4) and an equation (5) given below. Then, weight vectors z1(n) and z2(n) are sequentially calculated beginning from weight vectors $z_1^{(0)}$ and $z_2^{(0)}$ of suitable initial values, and thus the weight vector w is approximately obtained.

$$z_1^{(n+1)} = D_1^{-1}(h_1 - (E_1 + F_1)z_1^{(n)} - G_1 z_2^{(n)}) \quad (4)$$

$$z_2^{(n+1)} = D_2^{-1}(h_2 - (E_2 + F_2)z_2^{(n)} - G_2 z_1^{(n+1)}) \quad (5)$$

The above equation (4) may be rewritten into equations (6) given below. The above equation (5) may be rewritten into equations (7) given below. Note that K=N/2.

$$w_0^{(n+1)} = \quad (6)$$
$$(1/R_{00})(h_0 - R_{01}w_1^{(n)} \cdots - R_{0K-1}w_{K-1}^{(n)} - R_{0,K}w_K^{(n)} - \cdots - R_{0N}w_{N-1}^{(n)})$$
$$w_1^{(n+1)} = (1/R_{11})$$
$$(h_1 - R_{10}w_0^{(n)} \cdots - R_{1K-1}w_{K-1}^{(n)} - R_{1,K}w_K^{(n)} \cdots - R_{0N}w_{N-1}^{(n)})$$
$$\vdots$$
$$w_{K-0}^{(n+1)} = (1/R_{K-1,K-1})(h_{K-1} - R_{K-1,1}w_0^{(n)} \cdots -$$
$$R_{K-1,K-1}w_{K-2}^{(n)} - R_{K-1,K}w_K^{(n)} \cdots - R_{K-1N}w_{N-1}^{(n)})$$

$$w_K^{(n+1)} = (1/R_{KK}) \quad (7)$$
$$(h_K - R_{K0}w_0^{(n+1)} \cdots - R_{KK-1}w_{K-1}^{(n+1)} - R_{K,K}w_K^{(n)} \cdots - R_{KN}w_{N-1}^{(n)})$$
$$w_{K+1}^{(n+1)} = (1/R_{K+1,K+1})(h_{K+1} - R_{K+1,0}w_0^{(n+1)} \cdots -$$
$$R_{K+1,K-1}w_{K-1}^{(n+1)} - R_{K+1,K}w_K^{(n)} \cdots - R_{K+1,N}w_{N-1}^{(n)})$$
$$\vdots$$
$$w_{N-1}^{(n+1)} = (1/R_{N-1,N-1})(h_{N-1} - R_{N-1,0}w_0^{(n+1)} \cdots -$$
$$R_{N-1,K-1}w_{K-1}^{(n+1)} - R_{N-1,K}w_K^{(n)} \cdots - R_{N-1N}w_{N-1}^{(n)})$$

As expressed by the equations (6), no unknown variable is included in each of equations for calculating the weight vector $z_1$ in the first half of the weight vector w, and therefore it is possible to execute all the equations. As expressed by the equations (7), an unknown variable is included in each of equations for calculating the weight vector $z_2$ in the second half of the weight vector w. However, these unknown variables are values obtained by the above equations (6). For this reason, after calculation of the above equations (6), it is possible to execute in parallel all the equations for calculating the weight vector $z_2$ in the second half of the weight vector w.

In such a way, the update algorithm of the modified Gauss-Seidel method is an update algorithm using each of update equations corresponding to a plurality of vectors into which a vector representing approximate solutions is divided. Compared with the update algorithm of the typical Gauss-Seidel method, the update algorithm of the modified Gauss-Seidel method makes it possible to concurrently execute more operations, which, in turn, improves the efficiency of parallel processing. In addition, the modified Gauss-Seidel method allows the weight vector w to be updated faster than the Gauss-Jacobi method, leading to fast convergence. However, the modified Gauss-Seidel method, when used alone, causes the divergence to occur in some cases.

(Switchover Between Update Algorithms)

Figure 10:
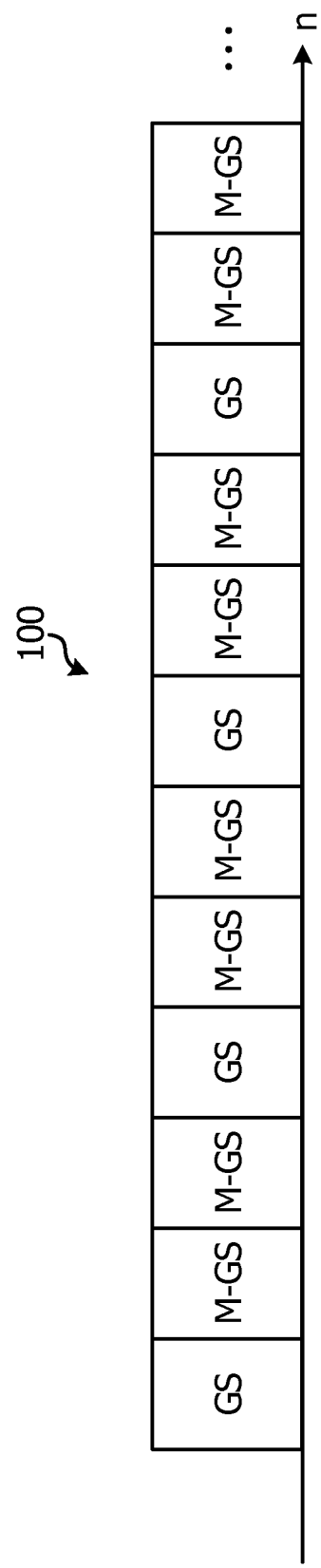
FIG. 10 is an illustration depicting an example of switchover between update algorithms.

FIG. 10 is an illustration depicting an example of switchover between update algorithms. A switching order 100 depicted in FIG. 10 indicates the order in which the update algorithm of the Gauss-Seidel method and the update algorithm of the modified Gauss-Seidel method are switched by the updater selection 21 according to the third embodiment.

In the example illustrated in the switching order 100, the updater selection 21 alternately switches one iteration of the update algorithm (GS) of the Gauss-Seidel method and two iterative steps of the update algorithm (M-GS) of the modified Gauss-Seidel method. Thus, it is expectable that, in a situation where the divergence occurs when the modified Gauss-Seidel method is used alone, approximate solutions will remain within the radius of convergence owing to the update algorithm of the Gauss-Seidel method inserted into the middle of the process, and, as a result, converge will occur.

For example, the updater selection 21 stores information (a table or the like) indicating the switching order 100, and, based on the stored information, switches the update algorithm of the Gauss-Seidel method and the update algorithm of the modified Gauss-Jacobi method.

(Approximate Solutions in Case of Switching Gauss-Seidel Method and the Modified Gauss-Seidel Method)

Figure 11:
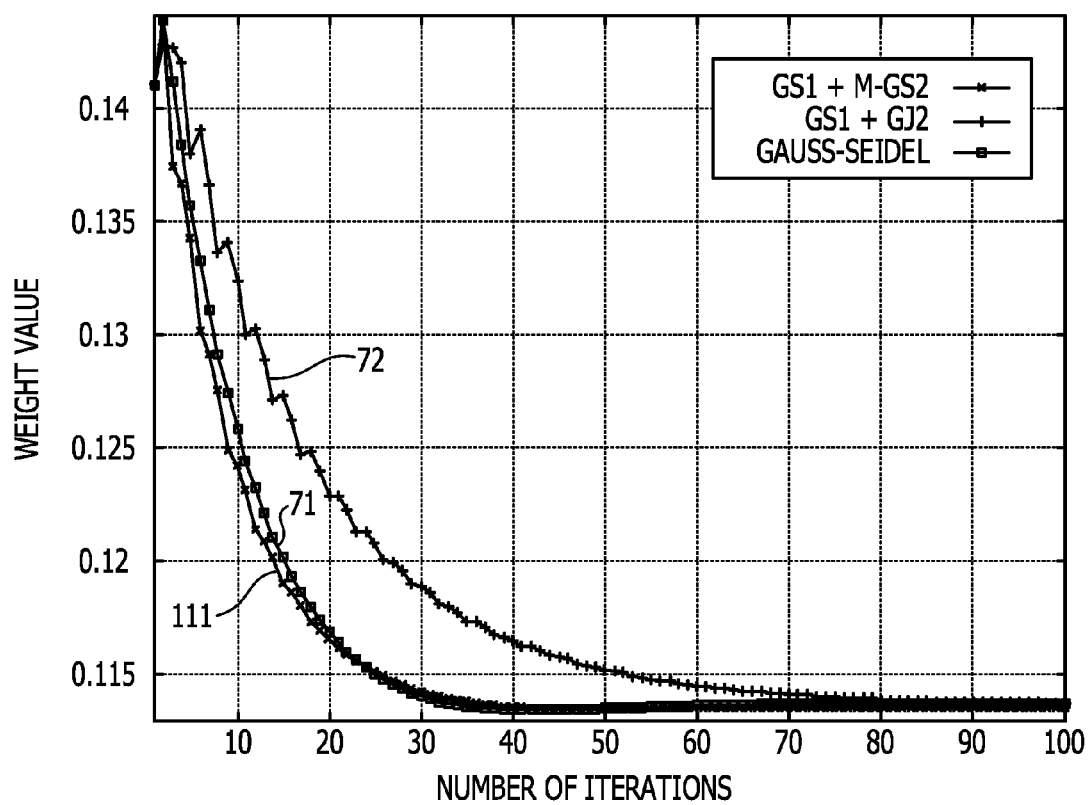
FIG. 11 is a graph depicting an example of approximate solutions in the case where the Gauss-Seidel method and the Modified Gauss-Seidel method are switched.

FIG. 11 is a graph depicting an example of approximate solutions in the case where the Gauss-Seidel method and the Modified Gauss-Seidel method are switched. In FIG. 11, components similar to those illustrated in FIG. 7 are denoted by the same reference numerals and redundant description thereof is omitted. An operation result 111, similarly to the operation results 71 and 72, indicates an operation result of approximate solutions (composite weights) with respect to the number of iterative steps.

The operation result 111 (GS1+M−GS2) indicates an operation result in the case where one iteration of the update algorithm (GS) of the Gauss-Seidel method and two iterative steps of the update algorithm (M-GS) of the Gauss-Seidel method are alternately switched (for example, see FIG. 10).

As indicated by the operation results 72 and 111, switching the update algorithms of the Gauss-Seidel method and the modified Gauss-Seidel method may cause the time taken to achieve convergence to be shorter than in the case where the update algorithms of the Gauss-Seidel method and the Jacobi method are switched.

In such a way, according to the third embodiment, the update algorithms of the Gauss-Seidel method and the modified Gauss-Seidel method may be alternately switched in accordance with the number of iterative steps of an iterative method. That is, an update algorithm using an update equation corresponding to one vector representing approximate solutions and an update algorithm using each of update equations corresponding to a plurality of vectors into which the vector representing approximate solutions is divided are alternately switched. This makes it possible to improve the parallel processing efficiency while suppressing the divergence of approximate solutions.

Fourth Embodiment (Arithmetic Device According to Fourth Embodiment)

Figure 12A:
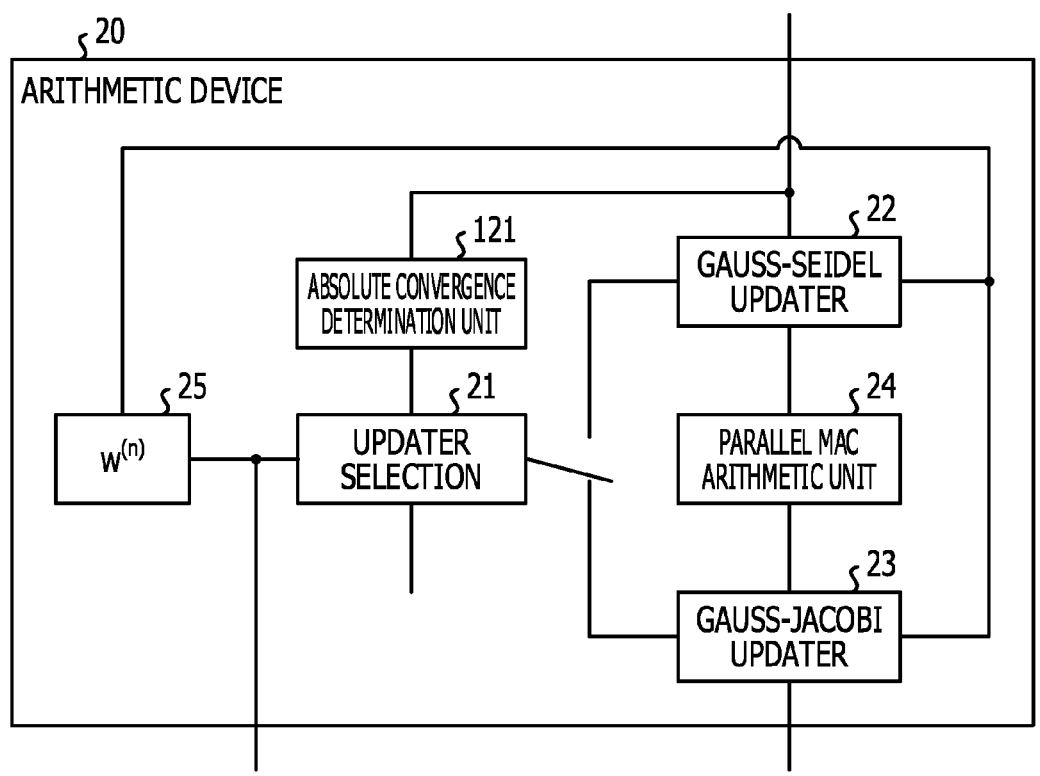
FIG. 12A is a block diagram illustrating an example of an arithmetic device according to a fourth embodiment.
Figure 12B:
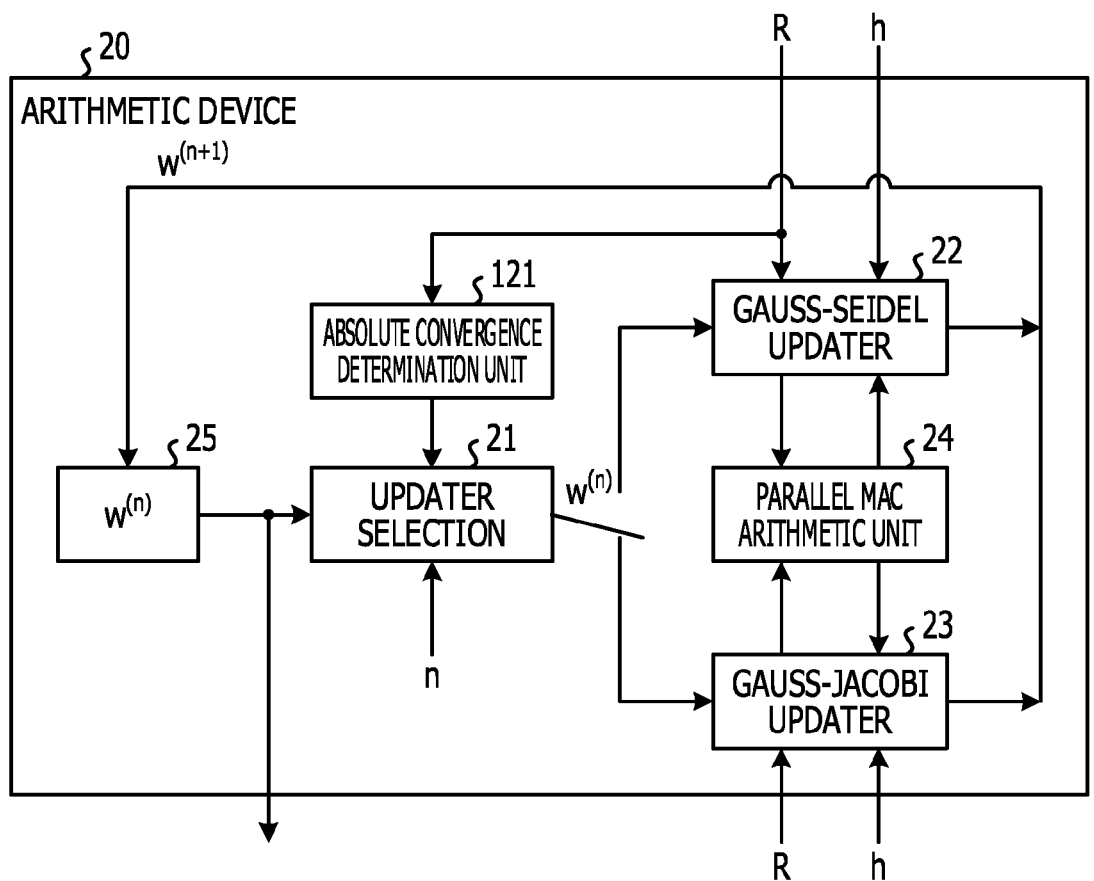
FIG. 12B is a block diagram illustrating an example of a flow of signals in the arithmetic device illustrated in FIG. 12A.

FIG. 12A is a block diagram illustrating an example of an arithmetic device according to a fourth embodiment. FIG. 12B is a block diagram illustrating an example of a flow of signals in the arithmetic device illustrated in FIG. 12A. In FIG. 12A and FIG. 12B, components similar to those illustrated in FIG. 2A and FIG. 2B are denoted by the same reference numerals and redundant description thereof is omitted. As illustrated in FIG. 12A and FIG. 12B, the arithmetic device 20 according to the fourth embodiment includes an absolute convergence determination unit 121 in addition to the configuration illustrated in FIG. 2A and FIG. 2B. The absolute convergence determination unit 121 may be implemented by, for example, the control circuit 51 illustrated in FIG. 5A and FIG. 5B.

The absolute convergence determination unit 121 determines whether or not the condition that convergence occurs every time when the Gauss-Jacobi method is used (referred to as an "absolute convergence condition") is satisfied, based on the correlation matrix R input to the Gauss-Seidel updater 22 and the Gauss-Jacobi updater 23.

The absolute convergence condition is a condition that, for each row of the correlation matrix R, the absolute value of a diagonal component of that row is greater than the sum of absolute values of components other than the diagonal component. For example, the absolute convergence determination unit 121 determines whether or not the condition expressed by expression (8) given below is satisfied. The absolute convergence determination unit 121 outputs a determination result to the updater selection 21.

$$|R_{ii}| > \sum_{j \neq i} |R_{ij}| \quad (i = 1, 2, \ldots, n) \quad (8)$$

Based on the determination result output from the absolute convergence determination unit 121, if the absolute convergence condition is satisfied, the updater selection 21 selects the Gauss-Jacobi updater 23 (the Gauss-Jacobi method) regardless of the number of iterative steps n. Thus, in a situation where convergence occurs every time even with the Gauss-Jacobi method, using the Gauss-Jacobi method makes it possible to improve the efficiency of parallel processing.

In such a way, according to the fourth embodiment, it may be determined whether or not a linear equation satisfies the absolute convergence condition that approximate solutions obtained by an iterative method using the Gauss-Jacobi method converge every time. Then, based on a determination result, during a period when the linear equation satisfies the absolute convergence condition, the update algorithm may be maintained to be one of the Gauss-Jacobi method regardless of the number of iterative steps. This may provide better improvement in the parallel processing efficiency in a situation where the approximate solutions do not diverge even when the Gauss-Jacobi method is used.

Note that description has been given here of the case where when the update algorithms of the Gauss-Seidel method and the Gauss-Jacobi method are switched as described in the second embodiment, a determination as to the absolute convergence condition of the Gauss-Jacobi method is made. However, the determination is not limited to this. For example, when the update algorithms of the Gauss-Seidel method and the modified Gauss-Seidel method are switched as described in the third embodiment, a determination as to the absolute convergence condition of the Gauss-Seidel method may be made.

In this case, during a period when the linear equation satisfies the absolute convergence condition, the switching unit 12 maintains the update algorithm to the modified Gauss-Seidel method.

This may provide better improvement in the efficiency of parallel processing in a situation where the approximate solutions do not diverge even when the modified Gauss-Seidel method is used.

(Efficiency of Parallel Processing in Each Update Algorithm)

The number of clocks for solving a system of equations with 30 unknowns will be described for each update algorithm. Here, it is assumed that MAC operations may be executed in parallel by 64 operators, and the latency of pipeline processing at that time is 5 clocks. In addition, the number of iterative steps n is assumed to be 3.

Calculation of the Gauss-Seidel method is described first. Although 30×29=870 MAC operations are used for one update operation in any one of the methods, only about half of them may be executed in parallel in the Gauss-Seidel method. As a result, 870/2/64=6.79, and thus 7 clocks are used for this calculation. To obtain the entire result of this calculation, 5 clocks of latency are further used. In this case, however, the latency is hidden by the subsequent processing, and thus has no influence on the entire number of clocks.

For the remaining operations being not executable, operations of 29 rows, one by one, have to be executed sequentially while the result is being checked for. Consequently, (1+5)×29 clocks are used under the influence of latency. Iterating this three times gives (7+(1+5)×29)×3=543 clocks.

Next, in the Gauss-Jacobi method, all of the 870 MAC operations may be executed in parallel. As a result, 870/64=13.59, and thus 14 clocks for this calculation and 5 clocks of the latency are used for completion of operations. Iterating this three times gives (14+5)×3=57 clocks.

In the modified Gauss-Seidel method, each half of 870 MAC operations may be executed in parallel. The results of the first half of operations are used for the second half of operations, and therefore the second half of operations wait for the result of the first half of operations. For each of the first and second halves of operations, (7+5) clocks are used. Iterating this three times gives ((7+5)+(7+5))×3=72 clocks.

That is, 543 clocks are used in the Gauss-Seidel method, 57 clocks are used in the Gauss-Jacobi method, and 72 clocks are used in the Gauss-Seidel method. When these results are compared, the Gauss-Seidel method and the Gauss-Jacobi method differ in the number of processing steps by approximately ten times. It is found that, in the Gauss-Seidel method, parallel processors are not fully utilized, and the latency has a significant influence. In contrast, in the modified Gauss-Seidel method, although the number of clocks is larger than that in the Gauss-Jacobi method, the number of clocks increases by about 26% from that in the Gauss-Jacobi method.

In such a way, by using the Gauss-Jacobi method and the modified Gauss-Seidel method, the number of steps to be used may be reduced. By using the update algorithm of the Gauss-Seidel method in addition to them, convergence characteristics may be maintained. In other words, an approach with a smaller number of steps to be used and with good convergence may be achieved.

As described above, with the arithmetic device, the arithmetic method, and the wireless communication device, it may be achieved to improve the efficiency of parallel processing while suppressing the divergence.

For example, with an equalizer designed for single carrier signals in a wireless receiver, a large-size linear equation is solved in order to find the equalizer weight. The amount of this operation has an influence on the power consumption in a portable terminal. For this reason, in some cases, a linear equation is not solved strictly but a solution is approximately obtained by using an iterative method. As this iterative method, the Gauss-Seidel method and the Gauss-Jacobi method are known. Although the amounts of operation for one iteration of both the methods are the same, the Gauss-Seidel method has good convergence.

In cases where single carrier signals are received under a multipath environment, it is known that applying adaptive equalization processing to the received signals may greatly improve the receiving sensitivity. Many equalizers are implemented by finite impulse response (FIR) filters. In order to fully exploit the performance, it is desirable that a composite weight used in an FIR filter is obtained with accuracy. In cases of mobile communication such as that in a portable telephone, the propagation environment rapidly changes particularly when the portable telephone moves at high speed, it is desired to obtain a composite weight with accuracy in a relatively short time.

In recent semiconductor products, improvement in the operation clock is limited. This is an issue for semiconductor technologies. To address this issue, these days, there is a tendency to improve processing capability by increasing the number of parallel processing operations instead of improving the operation clock. This applies to DSPs for use in signal processing, or the like. It is desired for the purpose of improving operation efficiency to find how to efficiently perform parallel processing.

With algorithms of mathematical operations of the Gauss-Seidel method or the like, many calculations in which the operation of "addition" is performed after the operation of "multiplication" are performed. For this reason, in many DSPs, MAC operators for performing both the operations of multiplication and addition as a set are used.

The Gauss-Seidel method is an approximate method where the convergence is relatively good. As described above, equations are solved sequentially from the top in this method. For this reason, the method is not suitable for parallel processing. That is, if operators capable of concurrently calculating all the rows are provided, some of the operators are unused since the equations have to be solved sequentially from the top. That is, with the Gauss-Seidel method, there is a probability that a large number of operators will not be fully utilized. In contrast, as described above, in the Gauss-Jacobi method, although the efficiency of parallel processing is high, the convergence is slightly poor.

On the other hand, according to embodiments described above, a plurality of update algorithms are switched in accordance with the number of iterative steps in the circuit in which linear equations are solved by an iterative method using a parallel processor, coexistence of convergence and parallel processing efficiency may be achieved by switching a plurality of update algorithms in accordance with the number of iterative steps.

Note that although, in each of the foregoing embodiments, the case where the arithmetic device 10 illustrated in FIG. 1A and FIG. 1B is used for the circuit that calculates a composite weight of the equalizer has been described, application of the arithmetic device 10 is not limited to this. For example, the arithmetic device 10 may be used for various kinds of operations, such as a circuit simulator, image processing, computed tomography (CT) scan image generation, and finite-element-method analysis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic device comprising:
   a plurality of parallel processors; and
   a processor configured to control the plurality of parallel processors so as to calculate an approximate solution of an equation by using a first algorithm and a second algorithm switchably, each of the first algorithm and the second algorithm being algorithms providing an iterative method, the second algorithm causing a divergence more likely than the first algorithm, the second algorithm being performed more efficiently by the plurality of parallel processors than the first algorithm, the first algorithm and the second algorithm being switched each other between at least one pair of iterative steps of the iterative method.

2. The arithmetic device according to claim 1, wherein the second algorithm is an algorithm in which a spectral radius of an iterative matrix is larger than in the first algorithm.

3. The arithmetic device according to claim 1, wherein the second algorithm is an algorithm in which a number of concurrently executable operations is larger than in the first algorithm.

4. The arithmetic device according to claim 1, wherein
   the first algorithm is an algorithm based on Gauss-Seidel method, and
   the second algorithm is an algorithm based on Gauss-Jacobi method.

5. The arithmetic device according to claim 1, wherein the first algorithm and the second algorithm being switched each other periodically.

6. The arithmetic device according to claim 1, wherein
   the first algorithm uses an arithmetic expression that deals with one vector corresponding the approximate solution, and
   the second algorithm uses a plurality of arithmetic expressions that deal with a plurality of vectors into which the one vector is divided, respectively.

7. The arithmetic device according to claim 1, wherein the processor is configured to use the second algorithm without switching to the first algorithm, when the equation satisfies a condition indicating that the second algorithm brings a convergence to the approximate solution.

8. The arithmetic device according to claim 1, wherein the equation is a linear equation.

9. An arithmetic method comprising:
controlling a plurality of parallel processors by a processor so as to calculate an approximate solution of an equation by using a first algorithm and a second algorithm switchably, each of the first algorithm and the second algorithm being algorithms providing an iterative method, the second algorithm causing a divergence more likely than the first algorithm, the second algorithm being performed more efficiently by the plurality of parallel processors than the first algorithm, the first algorithm and the second algorithm being switched each other between at least one pair of iterative steps of the iterative method.

10. A wireless communication device comprising:
a plurality of parallel processors;
a processor configured to control the plurality of parallel processors so as to calculate an approximate solution of an equation by using a first algorithm and a second algorithm switchably, each of the first algorithm and the second algorithm being algorithms providing an iterative method, the second algorithm causing a divergence more likely than the first algorithm, the second algorithm being performed more efficiently by the plurality of parallel processors than the first algorithm, the first algorithm and the second algorithm being switched each other between at least one pair of iterative steps of the iterative method; and
an equalizer configured to perform equalization processing of wireless signals by using a weight based on the calculated approximate solutions.

* * * * *